(12) United States Patent
Li

(10) Patent No.: US 10,655,280 B1
(45) Date of Patent: May 19, 2020

(54) CONSTRUCTION METHOD FOR USING MODIFIED PHOSPHOGYPSUM IN ROADBED AND SLOPE

(71) Applicant: INSTITUTE OF GEOLOGY AND GEOPHYSICS, CHINESE ACADEMY OF SCIENCES, Chaoyang District, Beijing (CN)

(72) Inventor: Zhiqing Li, Beijing (CN)

(73) Assignee: INSTITUTE OF GEOLOGY AND GEOPHYSICS, CHINESE ACADEMY OF SCIENCES, Beijing (CN)

(*) Notice: Subject to any disclaimer, the term of this patent is extended or adjusted under 35 U.S.C. 154(b) by 0 days.

(21) Appl. No.: 16/730,693

(22) Filed: Dec. 30, 2019

(30) Foreign Application Priority Data

Feb. 15, 2019 (CN) .......................... 2019 1 0118172

(51) Int. Cl.
| | |
|---|---|
| *E01C 3/00* | (2006.01) |
| *E01C 21/00* | (2006.01) |
| *E01C 3/04* | (2006.01) |
| *C04B 18/04* | (2006.01) |
| *E02D 17/20* | (2006.01) |
| *A01C 21/00* | (2006.01) |

(52) U.S. Cl.
CPC .......... *E01C 3/003* (2013.01); *C04B 18/0445* (2013.01); *E01C 3/04* (2013.01); *E01C 21/00* (2013.01); *E02D 17/20* (2013.01); *A01C 21/00* (2013.01)

(58) Field of Classification Search
CPC . E01C 3/003; E01C 3/04; E01C 21/00; E02D 17/20; C04B 18/0445; A01C 21/00
USPC ......................................... 404/17–31, 72, 75
See application file for complete search history.

(56) References Cited

U.S. PATENT DOCUMENTS

| | | | | |
|---|---|---|---|---|
| 4,448,566 | A  * | 5/1984 | King ....................... | E01C 3/003 264/34 |
| 2009/0050025 | A1 * | 2/2009 | Wissa ................... | C04B 28/143 106/786 |
| 2012/0275861 | A1 * | 11/2012 | Myslowski ............ | C08G 75/02 404/75 |

* cited by examiner

*Primary Examiner* — Raymond W Addie
(74) *Attorney, Agent, or Firm* — Berenato & White, LLC

(57) ABSTRACT

A design and construction method for using modified phosphogypsum in a roadbed and slope, where the method includes preparing a phosphogypsum-containing roadbed mixture, setting moisture content of the roadbed mixture, preparing a phosphogypsum-containing slope mixture, and construction of a roadbed and slope. The preparation of the phosphogypsum-containing roadbed mixture includes 90 parts by weight of phosphogypsum and 10 parts by weight of cement, and uniformly mixed and stirred to obtain a base material mixture; and 2-4 parts by weight of sodium silicate is dissolved in water, and the obtained solution is added to the base material mixture to obtain the phosphogypsum-containing roadbed mixture. The design and construction method are simple, can satisfy roadbed strength and rebound modulus requirements, and can be widely applied to filling-deficient areas with a high yield of phosphogypsum solid wastes.

1 Claim, 1 Drawing Sheet

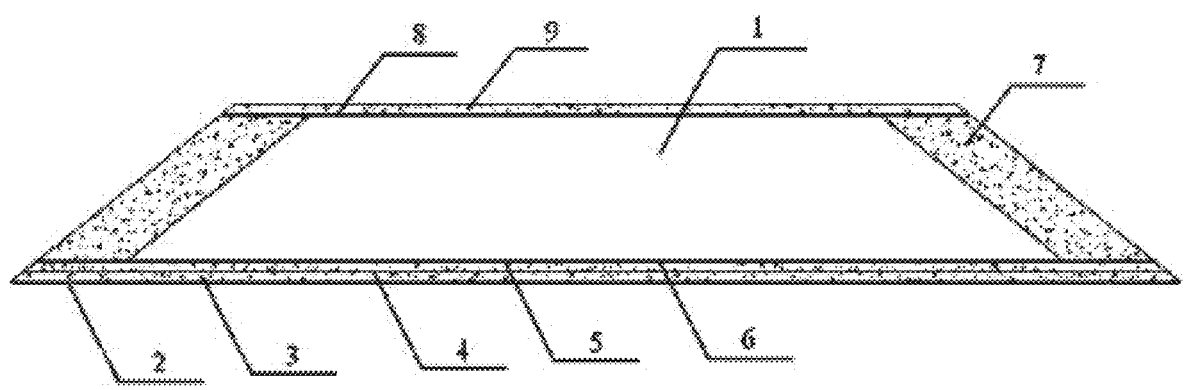

CONSTRUCTION METHOD FOR USING MODIFIED PHOSPHOGYPSUM IN ROADBED AND SLOPE

FIELD OF THE INVENTION

The invention relates to the field of highway engineering, and specifically, to a design and construction method for using modified phosphogypsum in a roadbed and slope.

BACKGROUND

Conventional roadbeds mainly include a rockfill roadbed, a soil-filled roadbed, and a rock-soil filled roadbed, the latter being the most common roadbed. The rock-soil filled roadbed needs to be filled by soil and rocks acquired from a borrow pit. There is a relatively large difference in physical and mechanical properties of fillers in different areas because of complex geological conditions in a highway construction site. If multiple types of soil-rock mixtures with different physical and mechanical properties are laid on the same pavement layer of a roadbed, it is difficult to compact and level the roadbed. Therefore, differential settlement can occur extremely easily after construction, thereby resulting in destruction and deformation of the road surface.

Phosphogypsum is a by-product produced when a wet process is adopted to produce phosphoric acid in a chemical plant by reaction between apatite and sulfuric acid. For every 1 ton of phosphoric acid produced, approximately 5 tons of phosphogypsum is produced. Phosphogypsum is a powdery material with almost no plasticity. There is phosphoric acid, sulfuric acid, and hydrofluoric acid in phosphogypsum, and therefore phosphogypsum is slightly acidic. More than 8 million tons of phosphogypsum is produced every year in China. By the end of 2011, more than 300 million tons of phosphogypsum in total has accumulated in China. If specific technical measures can be taken to apply phosphogypsum to roadbed filling, phosphogypsum stockpiling will be greatly reduced. On one hand, land resources are saved, and geological disasters of a phosphogypsum dam can be avoided. On the other hand, the problem of highway roadbed filling in a soil-deficient area can be resolved.

SUMMARY

An objective of the invention is to provide a design and construction method for using modified phosphogypsum in a roadbed and slope, to consume a large amount of phosphogypsum. The method can save land resources, and avoid geological disasters of a phosphogypsum dam. Additionally, the method can resolve a problem of highway roadbed filling in a soil-deficient area.

A technical solution of the invention is as follows: A design and construction method for using modified phosphogypsum in a roadbed and slope is provided, and includes the following steps:

(1) preparing a phosphogypsum-containing roadbed mixture: weighing 90 parts by weight of phosphogypsum and 10 parts by weight of cement, and uniformly mixing and stirring the phosphogypsum and the cement to obtain a base material mixture; and weighing 2-4 parts by weight of sodium silicate, dissolving the sodium silicate in water, and adding the obtained solution to the base material mixture to obtain the phosphogypsum-containing roadbed mixture;

(2) mixing the phosphogypsum-containing roadbed mixture with water: acquiring a part of the phosphogypsum-containing roadbed mixture by using an isostatic pressing method, adding water to prepare samples with different water content, and obtaining maximum dry density and optimal moisture content of the phosphogypsum-containing roadbed mixture in a same compaction energy condition, where moisture content of the phosphogypsum-containing roadbed mixture is defined as a mass percentage of water lost when heating is conducted at 120-130° C. for 9-12 h to a dry part of the roadbed mixture 1 at the temperature;

(3) adding water to the phosphogypsum-containing roadbed mixture according to the optimal moisture content obtained through the test, to make moisture content of the phosphogypsum-containing roadbed mixture reach the optimal moisture content, to obtain a roadbed filler, where mixing of the phosphogypsum-containing roadbed mixture is conducted in a plant mix manner by using a stock bin of a cement stabilized soil mixing station and a forced mixer; and an anti-seepage cushion layer is an anti-seepage geotechnical cloth or an anti-seepage geomembrane with a thickness not less than 1.0 mm;

(4) preparing a phosphogypsum-containing slope mixture: weighing 50 parts by weight of phosphogypsum and 50 parts by weight of planting soil, and uniformly mixing and stirring the phosphogypsum and the planting soil to obtain a slope mixture; and (5) transporting the roadbed filler and the slope mixture to a construction site, where a specific construction method includes the following:

1) leveling and compacting the original ground, and laying a soil filler above the groundwater level and the surface water level, where a loose laying depth of each layer of laid soil filler is not greater than 40 cm, and compactness is not less than 90%;

2) laying a first anti-seepage cushion layer on a full section of a top surface of a compacted soil-filled roadbed;

3) laying a first soil filler layer on a full section of the first anti-seepage cushion layer, where a loose laying depth of the first soil filler layer is not greater than 40 cm; conducting compaction and densification on the first soil filler layer in a condition of optimal moisture content; and laying a second anti-seepage cushion layer on a full section of the top surface of the first soil filler layer;

4) laying a second soil filler layer on a full section of the second anti-seepage cushion layer, where a loose laying depth of the second soil filler layer is not greater than 40 cm; conducting compaction and densification on the second soil filler layer in a condition of optimal moisture content, and laying a third anti-seepage cushion layer on a full section of the top surface of the second soil filler layer;

5) laying the phosphogypsum-containing roadbed mixture on a part of the top surface of the third anti-seepage cushion layer, where a loose laying depth of each layer of phosphogypsum-containing roadbed mixture is not greater than 40 cm; conducting isostatic compaction and densification in a condition of optimal moisture content; and laying a road-shoulder soil filler on two sides of the top surface of the third anti-seepage cushion layer, where the width of the road-shoulder soil filler on each side along a roadbed section direction is not less than 1.5 m, and a loose laying depth of each layer of road-shoulder soil filler is not greater than 40 cm; and conducting compaction and densification on the road-shoulder soil filler in a condition of optimal moisture content;

6) after the phosphogypsum-containing roadbed mixture and the road-shoulder soil filler are compacted to an upper embankment by layer, laying a fourth anti-seepage cushion layer on full sections of the top surfaces of the phosphogypsum-containing roadbed mixture and the road-shoulder soil filler; laying a third soil filler layer on a full section of the fourth anti-seepage cushion layer, where a loose laying depth of the third soil filler layer is not greater than 40 cm; and conducting compaction and densification on the third soil filler layer in a condition of optimal moisture content, so as to form a filling roadbed; and 7) after the slope mixture is brushed to a design position as required, first hanging a wire entanglement; cultivating the phosphogypsum-containing slope mixture to the surface layer of the roadbed and slope, where a cultivation thickness is between 5 cm and 8 cm; spray-seeding grass and shrub seeds; and conducting greening protection.

The design and construction method are simple, can satisfy roadbed strength and rebound modulus requirements, and can be widely applied to a filling-deficient area and an area with a relatively high yield of phosphogypsum solid wastes. In addition, this method can reduce the presence of phosphogypsum in cultivated lands, reduce the damage of phosphogypsum to the environment, and turn waste into a useful product. Phosphogypsum can satisfy use requirements of roadbeds and slopes after being modified.

The invention is applicable to roadbed and slope filling in highway engineering, and in particular, to a filling-deficient road in a phosphogypsum-rich area.

BRIEF DESCRIPTION OF THE DRAWINGS

FIG. 1 is a schematic diagram of a design and construction method for using modified phosphogypsum in a roadbed and slope. In the FIGURE, there is a phosphogypsum-containing roadbed mixture 1, a first anti-seepage cushion layer 2, a first soil filler layer 3, a second anti-seepage cushion layer 4, a second soil filler layer 5, a third anti-seepage cushion layer 6, a road-shoulder soil filler 7, a fourth anti-seepage cushion layer 8, and a third soil filler layer 9.

DETAILED DESCRIPTION OF PREFERRED EMBODIMENTS

The specific implementations of the invention are further described below with reference to the accompanying drawing. The following embodiments are only used for illustrating the technical solutions of the invention more clearly, and is not intended to limit the claimed scope of the invention.

It should be understood that, in the description of the invention, terms such as "first", "second" and "third" are used only for the purpose of description, and are not intended to indicate or imply relative importance.

In an embodiment, a method for construction of a roadbed and slope by using modified phosphogypsum is provided, and includes the following steps:

(1) preparing a phosphogypsum-containing roadbed mixture 1: weighing 90 tons of phosphogypsum and 10 tons of cement, and uniformly mixing and stirring the phosphogypsum and the cement to obtain a base material mixture; and weighing 2 tons of sodium silicate, dissolving the sodium silicate in water, and adding the obtained solution to the base material mixture to obtain the phosphogypsum-containing roadbed mixture 1;

(2) mixing the phosphogypsum-containing roadbed mixture 1 with water: acquiring a part of the phosphogypsum-containing roadbed mixture 1 by using an isostatic pressing method, adding water to prepare samples with different water content, and obtaining maximum dry density and optimal moisture content of the phosphogypsum-containing roadbed mixture 1 in a same compaction energy condition;

(3) adding water to the phosphogypsum-containing roadbed mixture 1 according to the optimal moisture content obtained through the test, to make the moisture content of the phosphogypsum-containing roadbed mixture 1 reach the optimal moisture content, to obtain a roadbed filler;

(4) preparing a phosphogypsum-containing slope mixture: weighing 5 tons of phosphogypsum and 5 tons of planting soil, and uniformly mixing and stirring the phosphogypsum and the planting soil to obtain a slope mixture; and (5) transporting the roadbed filler and the slope mixture to a construction site, where a specific construction method includes the following:

1) leveling and compacting the original ground, and laying a soil filler above the groundwater level and the surface water level, where the loose laying depth of each layer of laid soil filler is 40 cm, and compactness is 90%;

2) laying a first anti-seepage cushion layer 2 on a full section of a top surface of a compacted soil-filled roadbed;

3) laying a first soil filler layer 3 on a full section of the first anti-seepage cushion layer 2, where a loose laying depth is 40 cm; conducting compaction and densification on the first soil filler layer 3 in a condition of optimal moisture content; and laying a second anti-seepage cushion layer 4 on a full section of the top surface of the first soil filler layer 3;

4) laying a second soil filler layer 5 on a full section of the second anti-seepage cushion layer 4, where a loose laying depth of the second soil filler layer 5 is 40 cm; conducting compaction and densification on the second soil filler layer 5 in a condition of optimal moisture content, and laying a third anti-seepage cushion layer 6 on a full section of the top surface of the second soil filler layer 5;

5) laying the phosphogypsum-containing roadbed mixture 1 on a part of the top surface of the third anti-seepage cushion layer 6, where a loose laying depth of each layer of phosphogypsum-containing roadbed mixture 1 is 40 cm; conducting isostatic compaction and densification in a condition of optimal moisture content; and laying a road-shoulder soil filler 7 on two sides of the top surface of the third anti-seepage cushion layer, where the width of the road-shoulder soil filler 7 on each side along a roadbed section direction is 2.0 m, and a loose laying depth of each layer of road-shoulder soil filler 7 is 40 cm; and conducting compaction and densification on the shoulder soil filler in a condition of optimal moisture content;

6) after the phosphogypsum-containing roadbed mixture 1 and the road-shoulder soil filler 7 are compacted to an upper embankment by layer, laying a fourth anti-seepage cushion layer 8 on full sections of the top surfaces of the phosphogypsum-containing roadbed mixture 1 and the road-shoulder soil filler 7; laying a third soil filler layer 9 on a full section of the fourth anti-seepage cushion layer 8, where a loose laying depth of the third soil filler layer 9 is 40 cm; and conducting compaction and densification on the third soil filler layer 9 in a condition of optimal moisture content, so as to form a filling roadbed; and 7) after the slope mixture is brushed to a design position as required, first hanging a wire entanglement; cultivating the phosphogypsum-containing slope mixture to the surface layer of the roadbed and slope, where a cultivation thickness is 8 cm; spray-seeding grass and shrub seeds; and conducting greening protection.

The above embodiments are merely preferred specific implementations of the invention, but the protection scope of the invention is not limited thereto. Any simple variation or equivalent replacement easily made by those skilled in the art within the technical scope of the invention should fall within the protection scope of the invention.

What is claimed is:

1. A design and construction method for using modified phosphogypsum in a roadbed and slope, wherein the method comprises the following steps:
   (1) preparing a phosphogypsum-containing roadbed mixture (1): weighing 90 parts by weight of phosphogypsum and 10 parts by weight of cement, and uniformly mixing and stirring the phosphogypsum and the cement to obtain a base material mixture; and weighing 2-4 parts by weight of sodium silicate, dissolving the sodium silicate in water, and adding an obtained solution to the base material mixture to obtain the phosphogypsum-containing roadbed mixture (1);
   (2) mixing the phosphogypsum-containing roadbed mixture (1) with water: acquiring a part of the phosphogypsum-containing roadbed mixture (1) by using an isostatic pressing method, adding water to prepare samples with different water content, and obtaining maximum dry density and optimal moisture content of the phosphogypsum-containing roadbed mixture (1) in a same compaction energy condition;
   (3) adding water to the phosphogypsum-containing roadbed mixture (1) according to the optimal moisture content obtained through the test, to make moisture content of the phosphogypsum-containing roadbed mixture (1) reach the optimal moisture content, to obtain a roadbed filler, where mixing of the phosphogypsum-containing roadbed mixture (1) is conducted in a plant mix manner by using a stock bin of a cement stabilized soil mixing station and a forced mixer; and an anti-seepage cushion layer is an anti-seepage geotechnical cloth or an anti-seepage geomembrane with a thickness not less than 1.0 mm;
   (4) preparing a phosphogypsum-containing slope mixture: weighing 50 parts by weight of phosphogypsum and 50 parts by weight of planting soil, and uniformly mixing and stirring the phosphogypsum and the planting soil to obtain a slope mixture; and
   (5) transporting the roadbed filler and the slope mixture to a construction site, wherein a specific construction method comprises the following:
      1) leveling and compacting original ground, and laying a soil filler above a groundwater level and a surface water level, wherein a loose laying depth of each layer of laid soil filler is not greater than 40 cm, and compactness is not less than 90%;
      2) laying a first anti-seepage cushion layer (2) on a full section of a top surface of a compacted soil-filled roadbed;
      3) laying a first soil filler layer (3) on a full section of the first anti-seepage cushion layer (2), wherein a loose laying depth of the first soil filler layer (3) is not greater than 40 cm; conducting compaction and densification on the first soil filler layer (3) in a condition of optimal moisture content; and laying a second anti-seepage cushion layer (4) on a full section of the top surface of the first soil filler layer (3);
      4) laying a second soil filler layer (5) on a full section of the second anti-seepage cushion layer (4), wherein a loose laying depth of the second soil filler layer (5) is not greater than 40 cm; conducting compaction and densification on the second soil filler layer (5) in a condition of optimal moisture content, and laying a third anti-seepage cushion layer (6) on a full section of the top surface of the second soil filler layer (5);
      5) laying the phosphogypsum-containing roadbed mixture (1) on a part of the top surface of the third anti-seepage cushion layer (6), wherein a loose laying depth of each layer of phosphogypsum-containing roadbed mixture (1) is not greater than 40 cm; conducting isostatic compaction and densification in a condition of optimal moisture content; and laying a road-shoulder soil filler (7) on two sides of the top surface of the third anti-seepage cushion layer (6), wherein a laying width of the road-shoulder soil filler (7) on each side along a roadbed section direction is not less than 1.5 m, and a loose laying depth of each layer of road-shoulder soil filler (7) is not greater than 40 cm; and conducting compaction and densification on the road-shoulder soil filler (7) in a condition of optimal moisture content;
      6) after the phosphogypsum-containing roadbed mixture (1) and the road-shoulder soil filler (7) are compacted to an upper embankment by layer, laying a fourth anti-seepage cushion layer (8) on full sections of the top surfaces of the phosphogypsum-containing roadbed mixture (1) and the road-shoulder soil filler (7); laying a third soil filler layer (9) on a full section of the fourth anti-seepage cushion layer (8), wherein a loose laying depth of the third soil filler layer (9) is not greater than 40 cm; and conducting compaction and densification on the third soil filler layer (9) in a condition of optimal moisture content, so as to form a filling roadbed; and
      7) after the slope mixture is brushed to a design position as required, first hanging a wire entanglement; cultivating the phosphogypsum-containing slope mixture to the surface layer of the roadbed and slope, wherein a cultivation thickness is between 5 cm and 8 cm; spray-seeding grass and shrub seeds; and conducting greening protection.

* * * * *